Patented July 5, 1938

2,122,569

UNITED STATES PATENT OFFICE 2,122,569

PROCESS FOR REFINING GYPSUM

Donald N. Griffin, Fort Wayne, Ind., assignor to The Deister Concentrator Company, Fort Wayne, Ind., a corporation of Indiana No Drawing. Application November 6, 1935, Serial No. 48,494

3 Claims. (Cl. 209—49)

This invention pertains to a process for refining gypsum.

Gypsum is found in nature in conjunction with various materials, but often with dolomite and sometimes with limestone.

While gypsum often occurs in nature in a nearly pure form, and also in association with a variety of other materials, the present invention is directed toward the working of such deposits as contain dolomite and limestone. Such deposits often depend for their practical value upon the application of a process of refinement particularly suited to the materials involved in order to attain an efficiency of operation which will be economically practical.

It is one of the purposes of this invention, therefore, to provide such a process suited particularly to the separation of gypsum from dolomite and limestone.

Where gypsum is obtained in association with dolomite they are separated by grinding to a coarsely granulated form. As dolomite is harder than gypsum it consumes the greater portion of the power used in grinding, and, as the dolomite is often discarded, this portion of the power consumed is waste and should be reduced to a minimum. Furthermore, subsequent steps of the process may be carried out at a higher efficiency with the material in coarsely granular form. And in such cases where the separated dolomite may be marketed, its relative coarseness usually enhances its value. An object of this invention, therefore, is to provide a process whereby gypsum may be separated from its associated materials without the necessity of excessively fine grinding.

Another object is to provide a method whereby the amount of reagents required for treating the material is reduced to a minimum.

Another object is to provide a method whereby the advantages of concentrator table classification may be applied to the refining of gypsum.

Further objects will appear from the following description of a typical method of carrying out the process of this invention.

In accordance with this invention, the raw material, containing gypsum in association with dolomite and/or limestone, is ground in a grinder of any suitable type to a granular form of proper size of grain, as will be more fully pointed out hereinafter. Pulverization, or grinding too finely, is particularly avoided, as the process is well adapted to handling fairly coarse granular materials, and excessive fineness increases the quantity of reagent required. The grinding is preferably carried to a stage, just sufficient to unlock the separate ingredients from each other and to free the grains of relatively pure gypsum. As a result of this grinding, the ground material contains distinct ingredients—namely, gypsum, in granular form, containing grains of relatively pure gypsum, and gangue material, also in granular form, and containing dolomite and/or limestone.

The ground material is then sized in order to eliminate grains of unfavorable size. This is done by two screening operations, adapted to determine the largest and smallest sizes of grains. The first screening operation is on a screen preferably of about 6 mesh. This determines as the maximum size grain those which will pass through the 6 mesh screen. The material which stays on this screen is considered oversize and returned to the grinder for further reduction.

The material which passes through the 6 mesh screen, may contain considerable undersize material, practically in pulverized form, which is too fine to be handled efficiently in accordance with this process. The material passing through the 6 mesh screen is, therefore, passed over a second screen of about 100 mesh, which sifts out the undersize material too fine for economic handling. The undersize from this second screen is either rejected or advanced to another process suitable for operating on this grade of material. The product from the screening operation is, therefore, mostly between the 6 mesh and the 100 mesh size.

The above classification is, of course, not necessarily carried out on screens. The fine material can be washed out of the minus 6 mesh material by any one of the numerous dewatering, desliming or washing devices commonly used in ore dressing and allied arts. Hydraulic classification may be applied for this purpose. In that event the hydraulic classifier, of which there are several common types, would be so adjusted that it would deliver a coarse product (mostly above 6 mesh) which would be returned to the grinding circuit, an intermediate product (mostly through 6 mesh and on 100 mesh) which would go to the table circuit, as will be described hereinafter, and a fine product (mostly through 100 mesh) which may either be discarded or go to further processing.

The ground material resulting from the sizing operation is then treated with a reagent having a selective action adapted to coat the gangue material, while the gypsum ingredient is left uncoated. This selective treatment renders the coated grains more buoyant in water, while the gypsum grains are wetted and tend to sink to the bottom. The treatment is carried out in a moist pulp, containing approximately 30 to 40 per cent. of water and with a proper degree of agitation so as not only to thoroughly mix and coat the grains of the gangue material, but to promote the tendency to agglomeration which is found to take place between the coated grains of material. As a result of this treatment, there is an increased difference in buoyancy between the gypsum grains and those of the gangue material. The buoyancy of the gangue material is enhanced by coating the grains thereof, so that they are not wetted by the water, and the action of surface tension to promote flotation, may be brought into play. Furthermore, the tendency to agglomeration increases the displacement of the particles and thus enhances their buoyancy.

In carrying out this treatment, the ground material is pulped with a suitable dressing liquid, such as water, in the proportion of approximately 30 to 40 per cent, as mentioned above, to which is added a suitable reagent to selectively coat the different ingredients in order to enhance their buoyancy. It has been found that suitable agents for this purpose may be any of the salts of fatty acids (oleic, stearic, or palmitic). Good results have been obtained by adding, during this pulping stage, from 1½ pounds to 2 pounds of sodium oleate per long ton of dry material or equivalent amounts of oleic acid and sodium hydroxide. It has been found advantageous also to add at this point 4 to 5 pounds of fuel oil per ton. These reagents have the property of coating or oiling the grains of dolomite or limestone while the grains of gypsum are left uncoated and are wetted by the water. As a result of this selective treatment, the coated grains take on an enhanced buoyancy and tend to rise to an upper stratum, while the uncoated grains of gypsum tend to settle to a lower stratum.

As above-mentioned, the pulp may be agitated sufficiently to thoroughly mix the ingredients and to promote the tendency to agglomeration already mentioned.

The treated material is then subjected to wet table classification on an ordinary concentrator table. Such a table, usually provided with riffles running endwise and subjected to an endwise shaking action in the usual manner, causes the material passing thereover to stratify. The material treated as above described tends to stratify on the table, with the clean gypsum in the lower stratum and the treated or oiled gangue material in an upper stratum. The gangue material is thus removed by being washed over the side of the table, while the clean gypsum is obtained from the lower stratum, which is progressed by the table action to the foot end thereof.

Following is a flow sheet indicating the general procedure.

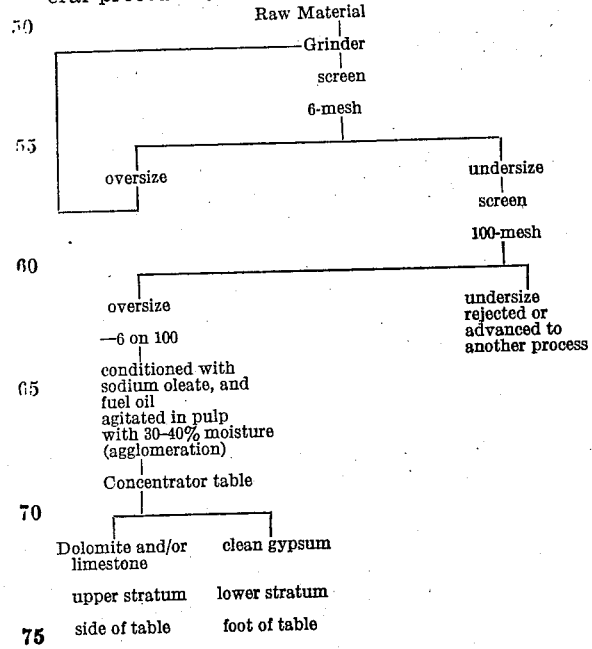

It will be noted that this process is particularly adapted to the separation of gypsum from dolomite and limestone. All of these ingredients are nearly of the same specific gravity so that it would be difficult if not impossible to separate them by ordinary table classification. By the oiling treatment, the buoyancy of certain ingredients is enhanced so that stratification is readily accomplished on the table. It will be noted also that it is the gangue material that is oiled, so that the gypsum comes off the table clean and requires only drying to be ready for the market. Furthermore, it is retained in granular form of substantial size of grains so that there is little or no loss in dust.

It is obvious that various changes may be made in the details of procedure, within the scope of the appended claims, without departing from the spirit of this invention. It is to be understood, therefore, that this invention is not limited to the specific details described.

Having thus described the invention, what is claimed is:

1. In the art of separating gypsum from mineral composed of interlocked grains of gypsum and limestone and/or dolomite, the process comprising, grinding the mineral to a size sufficient to unlock the grains of gypsum from the limestone and dolomite, treating an aqueous pulp of the ground material with fatty acid salt having a preferential affinity for the limestone and dolomite, stratifying the treated material by wet table classification, removing the limestone and dolomite in an upper stratum, and collecting the clean gypsum in a lower stratum.

2. In the art of separating gypsum from mineral composed of interlocked grains of gypsum and limestone and/or dolomite, the process comprising, grinding the mineral to a size sufficient to unlock the grains of gypsum from the limestone and dolomite, treating an aqueous pulp of the ground material with a petroleum oil having a preferential affinity for the limestone and dolomite, stratifying the treated material by wet table classification, removing the limestone and dolomite in an upper stratum, and collecting the clean gypsum in a lower stratum.

3. In the art of separating gypsum from mineral composed of interlocked grains of gypsum and limestone and/or dolomite, the process comprising, grinding the mineral to a size sufficient to unlock the grains of gypsum from the limestone and dolomite, treating an aqueous pulp of the ground material with fatty acid salt and a petroleum oil having a preferential affinity for the limestone and dolomite, stratifying the treated material by wet table classification, removing the limestone and dolomite in an upper stratum, and collecting the clean gypsum in a lower stratum.

DONALD N. GRIFFIN.